(12) United States Patent
Leau (10) Patent No.: US 12,229,140 B2
(45) Date of Patent: *Feb. 18, 2025

(54) EVENT SEQUENCES SEARCH

(71) Applicant: ELASTICSEARCH B.V., Amsterdam (NL)

(72) Inventor: Stefan-Costin Leau, Bucharest (RO)

(73) Assignee: Elasticsearch B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,097

(22) Filed: Aug. 21, 2023

(65) Prior Publication Data
US 2023/0401215 A1   Dec. 14, 2023

Related U.S. Application Data

(63) Continuation of application No. 17/244,870, filed on Apr. 29, 2021, now Pat. No. 11,734,279.

(51) Int. Cl.
*G06F 16/245* (2019.01)
*G06F 16/2455* (2019.01)

(52) U.S. Cl.
CPC .............................. *G06F 16/24553* (2019.01)

(58) Field of Classification Search
None
See application file for complete search history.

(56) References Cited

U.S. PATENT DOCUMENTS

| | | | | |
|---|---|---|---|---|
| 11,386,158 | B1* | 7/2022 | Bourbie | G06F 16/90324 |
| 2009/0089252 | A1* | 4/2009 | Galitsky | G06F 16/245 |
| 2013/0066855 | A1* | 3/2013 | Gupta | G06F 16/951 |
| | | | | 707/774 |
| 2016/0125041 | A1* | 5/2016 | Smith | G06F 16/2474 |
| | | | | 707/770 |
| 2016/0132566 | A1* | 5/2016 | Nguyen | G06F 16/248 |
| | | | | 707/722 |
| 2016/0283568 | A1* | 9/2016 | Praver | G06F 16/332 |
| 2018/0165327 | A1* | 6/2018 | Graefe | G06F 16/2246 |
| 2022/0365954 | A1* | 11/2022 | Patnaik | G06F 16/3325 |

* cited by examiner

*Primary Examiner* — Son T Hoang
(74) *Attorney, Agent, or Firm* — Quinn IP Law (57) ABSTRACT

Provided are methods and systems for searching event sequences. An example method includes receiving a request including a sequence of queries, the sequence of queries including a first query and a second query, the second query succeeding the first query in the sequence; executing the first query over a first dataset to determine a first event; executing the second query over a second dataset to determine a second event, the second event occurring after the first event; and generating, in response to the request, a further sequence including the first event and the second event. The method may include executing the first query over the first dataset to determine a third event and verifying that the third event has occurred after the second event.

18 Claims, 7 Drawing Sheets

Receive a request including a sequence of queries, the sequence of queries including a first query and a second query, the second query succeeding the first query in the sequence
505

Execute the first query over a first dataset to determine a first event
510

Execute the second query over a second dataset to determine a second event, the second event occurring after the first event
515

Generate, in response to the request, a further sequence including the first event and the second event
520

EVENT SEQUENCES SEARCH

CROSS-REFERENCE TO RELATED APPLICATIONS

This application is a continuation of U.S. patent application Ser. No. 17/244,870, filed Apr. 29, 2021, entitled "Event Sequences Search," the disclosure of which is incorporated by reference for all purposes.

TECHNICAL FIELD

This disclosure relates to computer security. More specifically, this disclosure relates to systems and methods for event sequence searches.

BACKGROUND

An analysis of log data of enterprise computer systems can reveal potential security risks and breaches. Existing technologies are limited to searches for specific static patterns in the log data in order to detect events related to security breaches, without correlating the events to each other. Correlating events using the existing search technologies can be both time and resources consuming, especially for distributed search and analysis engines.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to system and methods for event sequence searches. Embodiments of the present disclosure may allow analyzing data sources, for example log data of computing systems, to detect events correlated to each other and occurring within a predetermined time period. Specifically, embodiments of the present disclosure allow performing searches for sequences of events using distributed search and analysis engines.

According to one example embodiment of the present disclosure, a method for event sequences search is provided. The method may include receiving a request including a sequence of queries. The sequence of queries can include a first query and a second query. The second query succeeds the first query in the sequence. The method may include executing the first query over a first dataset to determine a first event. The method may include executing the second query over a second dataset to determine a second event, the second event occurring after the first event. The method may include generating, in response to the request, a further sequence including the first event and the second event.

The second query can be executed upon determining the first event. Alternatively, the second query can be executed concurrently with the first query. The first query and the second query include at least one common search key. The request includes a predetermined time period. Determining the second event may include determining that the first event and the second event occurs within a predetermined time period. The method may include executing the first query over the first dataset to determine a third event and verifying that the third event has occurred after the second event.

The method may include determining that the second event precedes event A1 and event A2, wherein event A1 and event A2 are results of executing the first query and the event A1 occurs prior to the event A2. The method may include preventing event A1 from generating a further sequence.

Determining of the first event may include executing the first query over a part of the first dataset to determine a first event sequence and successively selecting the first event from the first event sequence starting from the latest event in the first sequence. The determining of the second event may include executing the second query over the second data set to determine a second event sequence including events occurring after the earliest event in the first event sequence and selecting the second event from the second event sequence as the closest event occurring after the selected first event.

The method may include, instead of the executing the first query prior to the execution of the second query, executing the second query over the second dataset to determine the second event and executing the first query over the first dataset to determine the first event, the first event occurring before the second event.

The first dataset and the second dataset may include log data concerning operations of a computing system. The first event and the second event may include at least one of the following: an attempt to access the computing system via a port, an indication of a process started on the computing system, and one of an opening, creating, and modifying of a file on the computing system.

According to another embodiment, a system for event sequences search is provided. The system may include at least one processor and a memory storing processor-executable codes, wherein the processor can be configured to implement the operations of the above-mentioned method for event sequences search.

According to yet another aspect of the disclosure, there is provided a non-transitory processor-readable medium, which stores processor-readable instructions. When the processor-readable instructions are executed by a processor, they cause the processor to implement the above-mentioned method for event sequences search.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

The technology disclosed herein is concerned with methods and systems for event search systems. Embodiments of the present disclosure may facilitate analyzing data sources to detect presence of a sequence of events. Some embodiments of the present disclosure may analyze log data of computing systems to detect a sequence of events correlated to each other and distant by a pre-determined time of each other. More specifically, embodiments of the present disclosure may allow performing searches in response to requests including a sequence of queries, where each of the queries can filter out a specific event.

Unlike existing technologies, embodiments of the present disclosure may facilitate searching for the sequence of events using distributed search and analysis engines without requiring excessive resources in terms of memory and computing time. Some embodiments of the present disclosure may provide searches over data sources for a sequence of the latest events matching a sequence of queries. Other embodiments of the present disclosure may provide searches over data sources for a sequence of the earliest events matching the sequence of queries. The queries in the sequence may include common search keys.

The term "event" shall be construed to mean a portion of data describing an occurrence of an action that takes place at a given point in time. The terms "sequence of events" and "event sequence" shall be construed to mean a series of events that occur one after the other timewise and match a set of constraints individually and, potentially, as a group. The term "distributed search and analysis engine" shall be construed to mean a search engine including a cluster of computing nodes, where both storage of data and query processing is distributed between the computing nodes.

According to one example embodiment of the present disclosure, a method for event sequences search may include receiving a request including a sequence of queries and a pre-determined time span. The sequence of queries may include at least the first query and the second query, where the second query succeeds the first query in the sequence. The method may include executing the first query over a first dataset to determine a first event. The method may include executing the second query over a second dataset to determine a second event, the second event occurring after the first event within the pre-determined time period. The method may include generating, in response to the request, a further sequence including the first event and the second event.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1A:
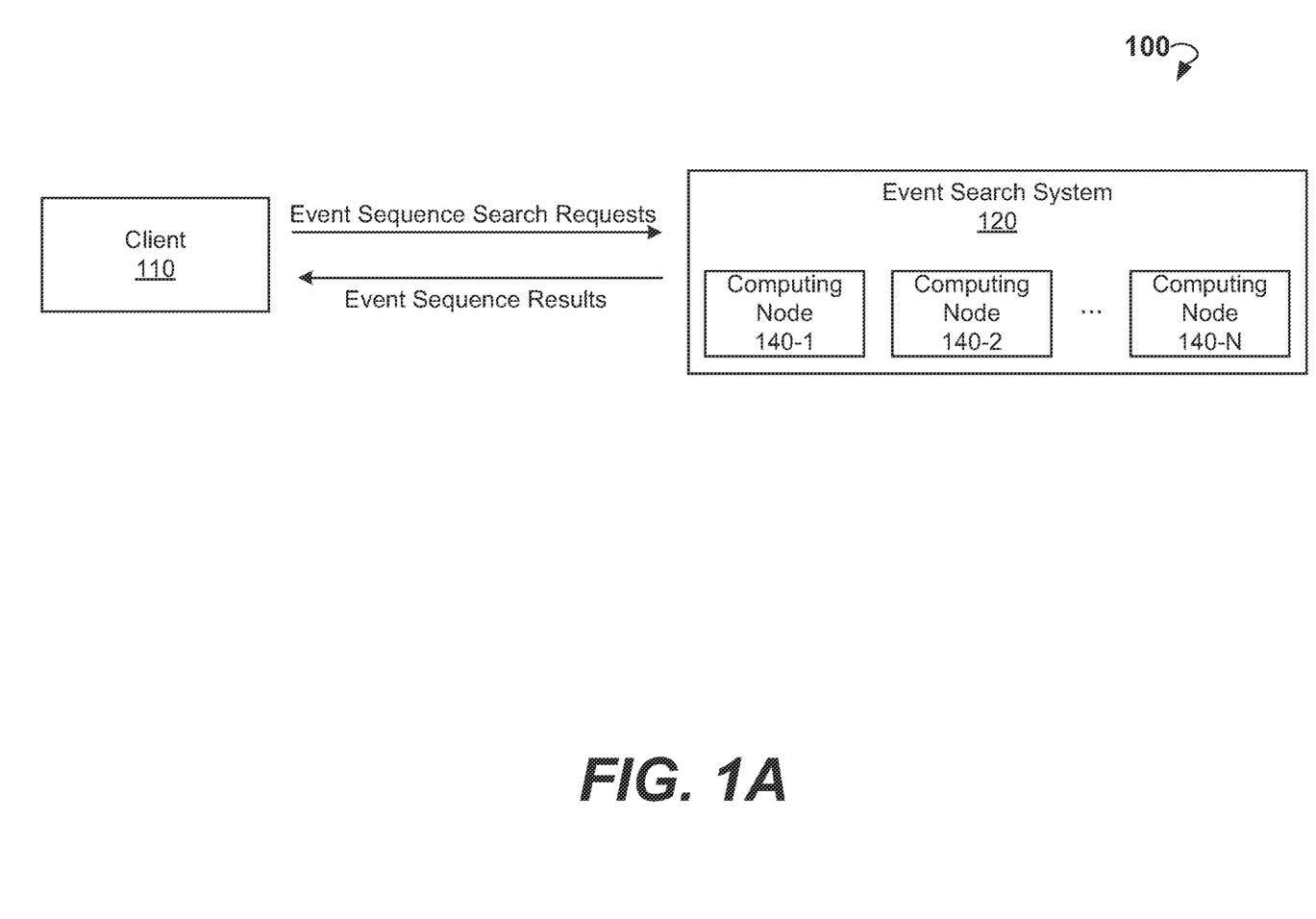
FIG. 1A is a block diagram of an example environment suitable for practicing methods for event sequences search as described herein.

FIG. 1A shows a block diagram of an example environment 100 suitable for practicing methods described herein. It should be noted, however, that the environment 100 is just one example and is a simplified embodiment provided for illustrative purposes, and reasonable deviations of this embodiment are possible as will be evident to those skilled in the art.

As shown in FIG. 1A, the environment 100 may include a client 110 and an event search system 120. In various embodiments, the client 110 may include, but are not limited to, a laptop computer, a tablet computer, a desktop computer, and so forth. The client 110 can include any appropriate device having network functionalities allowing the client 110 to communicate to the event search system 120. In some embodiments, the client 110 can be connected to the event search system 120 via one or more wired or wireless communications networks.

In some embodiments, the event search system 120 may include one or more computing node(s) 140-$i$ ($i=1, \ldots, N$). The event search system 120 may further include network switches and/or routers for connecting the one or more node(s) 140-$i$ ($i=1, \ldots, N$). The event search system 120 and can be implemented as a cluster of computer systems 600 described in FIG. 6.

In some embodiments, the one or more computing node(s) 140-$i$ ($i=1, \ldots, N$) may be configured to store data, perform indexing the data, perform searches in response to event sequence search requests from the client 110, and provide to the results of the event sequence search requests to the client 110.

In some embodiments, the data stored by the computing node(s) 140-$i$ ($i=1, \ldots, N$) may include log data concerning operations of computing system(s) of an enterprise. The log data may include attempts to access the computing system via a port, an indication of a process started on the computing system, an opening of a file or a folder, a creating of a file or a folder, and a modifying of a file or a folder on the computing system. An index can be a collection of the data that have similar characteristics. The index can be subdivided into multiple pieces called shards. Each shard can be a fully functional and independent "index" hosted on any of the computing node(s) 140-$i$ ($i=1, \ldots, N$) in the event search system 120. Shards can be both physical and logical divisions of an index. A shard can include a Lucene index. Lucene is an information retrieval software library. Lucene index may include one or more entities from the data. When an index is created, the number of shards can be specified.

In an example embodiment, an event sequence search request may include the first query matching an opening of a specific port of a computer system, and the second query matching a start of a specific process on the computing system, and a predetermined time period, for example 10 minutes. In response to the event search request, the event search system 120 can analyze the log data of the computing system to determine the first event matching the first query and the second event matching the second query such that the second event occurs no later than the predetermined time period after the first event. The event search system 120 may return the result sequence including the first event and the second event. The presence of a such sequence of events in the log data may be indicative of an attack on the computing system.

Figure 1B:
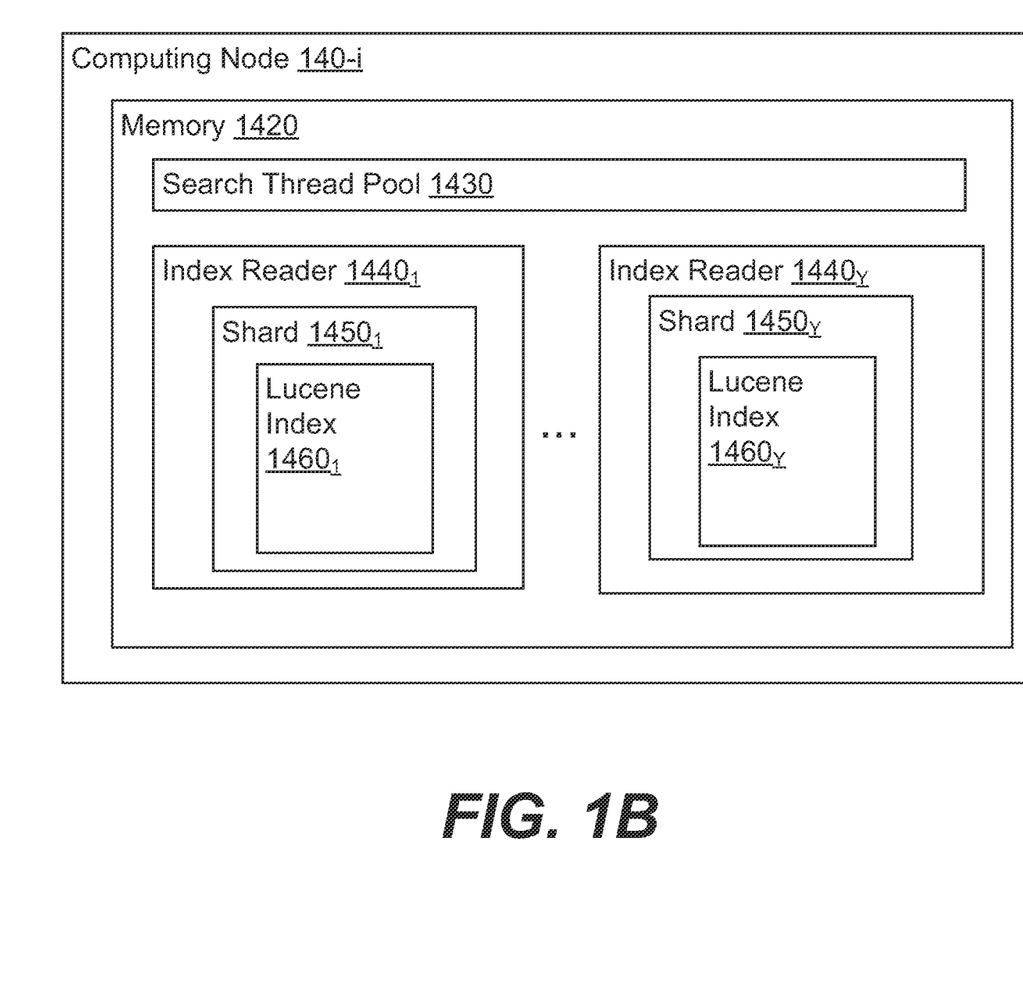
FIG. 1B is a block diagram showing an example node in an example distributed search and analysis engine, in accordance with various embodiments.

FIG. 1B is a block diagram showing an example computing node 140-$i$ in event search system 120, according to various example embodiments. The node 140-$i$ can include memory 1420. Memory 1420 can store search thread pool 1430 and index readers $1440_1$-$1440_Y$.

Search requests received by node 140-$i$ are processed by the search thread pool 1430. Search thread pool 1430 can be used to help in managing memory consumption by node 140-$i$. Search thread pool 1430 can include a (First-In-First-Out (FIFO)) queue, which holds pending requests. Index readers $1440_1$-$1440_Y$ can provide read access to shards $1450_1$-$1450_Y$. The shards may include Lucene indexes $1460_1$-$1460_Y$ and stored in memory 1420.

In some embodiments, an index can include time-based data, for example log data concerning operations of computing system(s). In these embodiments, only shards corresponding to recently created indexes (per an hour, a day, a week, and so forth) can be stored in memory 1420. The shards corresponding to "age out" indices can be stored in a disk storage and can be transferred to the memory if a search for the "age out" indices is requested. By way of example and not limitation, details of a distributed search and analysis system (as an example of the event search system 120) and computing nodes suitable for implementation embodiments of present disclosure are described in U.S. patent Ser. No. 10/891,165, entitled "Frozen indices," issued on Jan. 12, 2021, the subject matter of which is incorporated herein by reference in its entirety.

Figure 2:
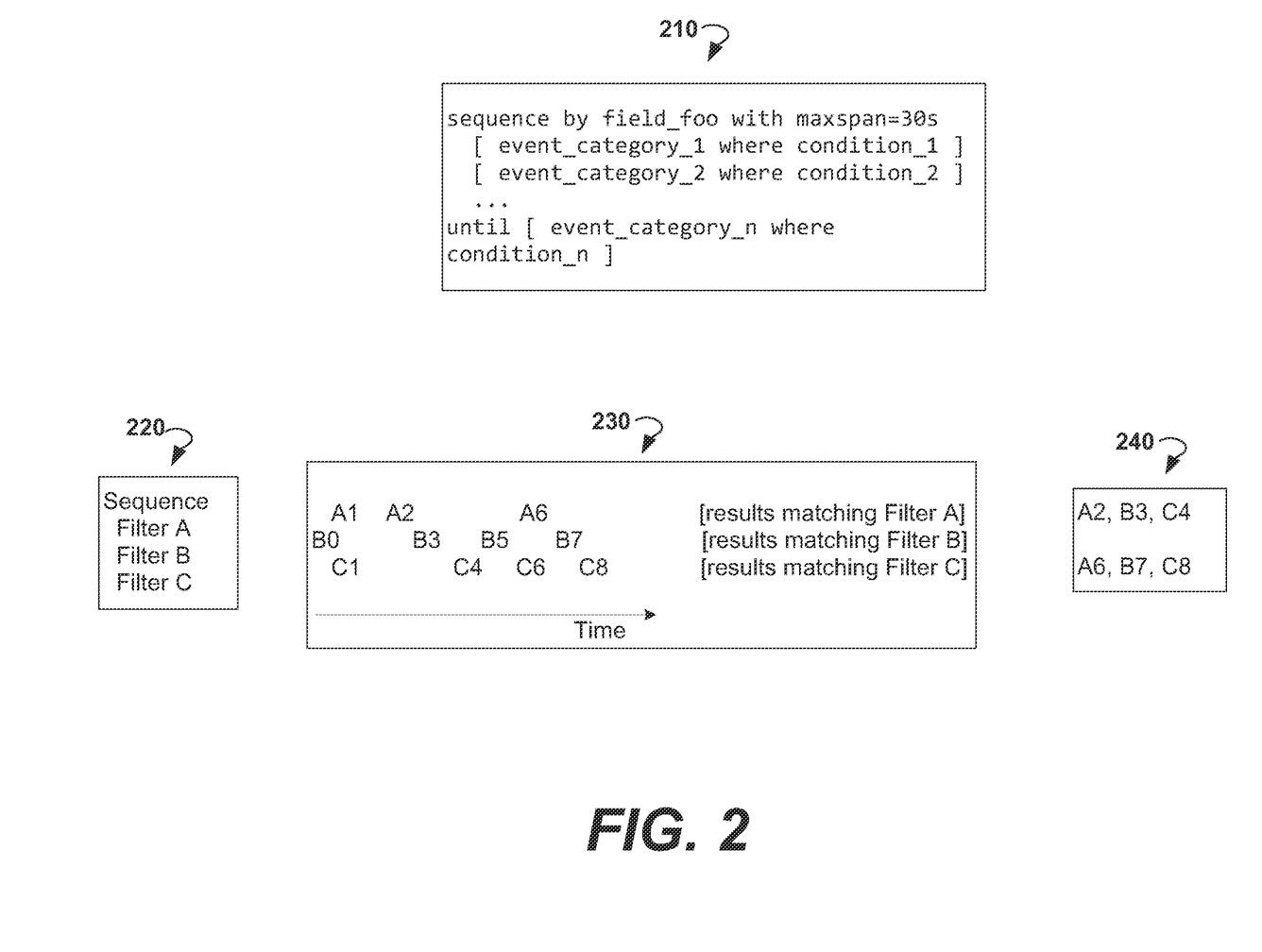
FIG. 2 are schematics showing an example event sequence search requests, example results of individual event search queries, and an example result of event sequence search, according to some example embodiments.

FIG. 2 depicts schematics showing an example event sequence search requests 210 and 220, example results 230 of executing individual event search queries, and an example result 240 of event sequence search, according to some example embodiments.

The request 210 is an example of an event sequence search request written in domain-specific event query language for identifying sequence in streams of events. In response to the request 210, the event search system 120 returns data ordered by time (a timestamp) in ascending order.

The request 210 includes a sequence of queries. The event search system 120 may find events in one or more datasets that match each query in the sequence and located one after the other in order declared in the request 210. The sequence may allow correlation between queries through join keys. The request 210 may also allow scoping of a sequence through the maxspan field. The maxspan may indicate that all matches should occur within the given time span or until the specified condition matches.

The processing of event sequence search requests by distributed search and analysis engines, for example, the event search system 120 described in FIGS. 1A and 1B, can require excessive memory because the distributed engines store large amount of data. Specifically, the amount of data needed to be stored in a memory can be large when the individual event queries include common search keys. In this case, the amount of data needed to be stored in the memory can be large due to large cardinality of sequence matching.

Embodiments of the present disclosure address the issue of excessive memory use by filtering events per stage, wherein each stage includes filtering events based on an individual event search query in the request. Embodiments of the present disclosure allow performing a global search by breaking the global search into searches corresponding to specific time windows and terminating searches once the event sequence is found. This approach allows searching by processing only a portion of data.

The queries in the sequence can be matched in ascending order, that is events occur one after the other. In certain embodiments, per user requests, the event search system 120 may return only the X earliest sequences (head sequences) of events representing the matches from a dataset. In some embodiments, per user requests, the event search system 120 may return only the latest X sequences (tail sequences) of the events representing the last matches from the dataset.

The example request 220 includes a sequence of three queries denoted as Filter A, Filter B, and Filter C. Results of matching individual queries over the dataset are shown as results 230. Each of the queries A, B, and C is matched to more than one events Ai, Bi, and Ci, respectively, where index $i$ represents a time stamp at which the event occurs. The result of the execution of the request 220 is shown as result 240. The result 240 includes only two event sequences: [A2, B3, C4] and [A6, B7, C8]. The result 240 can be determined based on time stamps of events by a state machine performing the following steps:

0: B0—there is no A preceding B0 (stage A) so B is ignored

1: A1 C1→[A1] is found (stage A) the state machine advances to stage B and C is ignored because no stage B is found yet.

2: A2 is found→[A2] is found (stage A) and the state machine expects a B. Previously found [A1] is overwritten with A2.

3: B3 is found→matches stage B so [A2, B3] sequence advances

4: C4 is found→matches stage C so [A2, B3, C4] sequence advances and completes.

5. B5 is found→no stage A exists, so the B5 is ignored.

6. A6, C6→no stage B, C6 is ignored, A6 matches, so A6 is remembered, and the B query is issued 7. B7 is found→matches A6→[A6, B7]

8. C8 is found→matches stage C→[A6, B7, C8]

The other potential sequences, such as [A1, B3, C4], [A1, B3, C6], [A2, B5, C8] are considered to be incorrect.

Determining Head Event Sequences

Figure 3:
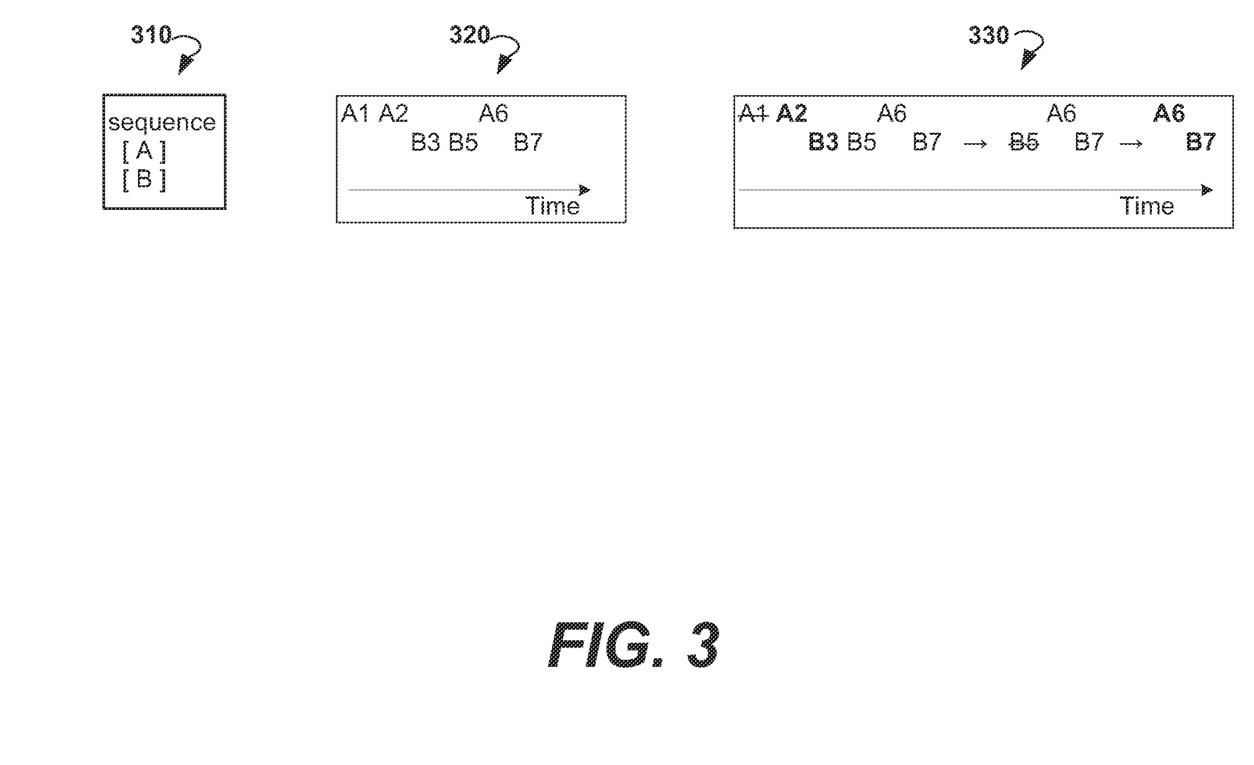
FIG. 3 are schematics showing an example event sequence search request, and details of processing of an event sequence search request, according to some example embodiments.

FIG. 3 is a schematic showing an example event sequence search request 310, result 320 of execution of individual queries of the request 310, and example processing 330 of the event sequence search request 310, according to some example embodiments.

The event sequence search request 310 requires finding all events As followed by events Bs.

In a pseudo-code, processing of the request 310 can be written as follows:

For Ac in (Find all A)

Find all B starting from Ac

Because event B has to follow event A, the events B that occur before or at the same time than the event A are ignored.

The data returned by the above pseudo-code can be extensive. Therefore, to expedite the processing, the processing may include an internal pagination. The potential set of results can be divided into chunks that can be safely processed. Thus, the search can be performed per a page, that is for a given chunk of size P. There can be a potential event A1 (first A to match in the page) and a potential event Ap (the last A to match in the page). The time between event A1 and the event Ap can be considered a tumbling window that navigates through the results without any overlap.

The pseudo-code for processing datasets in pages can be as follows:

Find all A in chunks of P
  For each chunk/tumbling window
    Mark Amin and Amax
    For Bc in (all B between Amin and Amax in chunks of P)
      Match Bc with [Amin, Amax]
    Until no more B are found
  Until no more A are found By breaking down the number of results into pages/windows, due to the implicit time order of events, each query in the sequence of the request 310 can take advantage of the results of the previous query and thus have a range boundary.

The result 320 corresponds to execution of individual queries of the request 310. The processing of determining event sequence can be as follows:

Step 1: executing query for A (the page size is irrelevant)→A1, A2 and A6 are returned.

Step 2: assigning Amin=A1 and Amax=A6.

Step 3: executing query for B between A1 and A6→B3 and B5 are returned.

Step 4: Iterate through the found Bs and find nearest As occurring before Bs.

Though events B3 and B5 can be merged and the events A1 and A2 can also be merged, there is only one correct match—[A2, B3]. To obtain event sequence [A2, B3], the results from the stage B are matched with the nearest result from the stage A occurring before the previous stage A is chosen. To avoid mismatches, all other matches A before the found item are removed.

The processing of determining event sequence by removing events is shown in FIG. 3 as processing 330 and can include the following steps:

Step 4.1:

B3 is chosen, A2 is the nearest match that occurs before B3→[A2, B3] is formed. Everything before A2 is removed on the A stage.

Step 4.2:

B5 is chosen, there is no A before the B5, so the B5 is removed. There are no more Bs.

Step 5:

Query for A is made starting with A6 (the Amax for the current tumbling window). No results are found but there is still an A, so the B stage is called.

Step 6:

Query for B starting with Amax→B7 is returned.

Step 7:

Find nearest A before B7, A6 is returned. All As before B7 (if any) are removed, the event sequence [A6, B7] is created.

In pseudo-code, the processing 330 can be written as follows:

For Bc in B
  Af=nearest A before Bc
  If Af exists
    remove all A before Af
    Create sequence Af, Bc Processing Sequences with Joins The time sequences can correlate queries using one or multiple keys:

sequence by J
[A] by X
[B] by Y
[C] by Z

The sequence above joins the queries A, B, and C based on two keys—J, which is a field common to all queries and I, which maps to X for the first query A, Y on the second query B, and Z on the third query C.

One of the issues for performing searches with joins is significantly increasing the cardinality of the sequence matching. It is required to find not just the B that follow A, but also determine whether A and B have a field in common which is found only at runtime based on the results returned by A. Therefore, a key (in case of no join keys is just an empty array) is associated with sequence at time the sequence is created. The key can be extracted from query B and used to find all the As that have occurred before B that share the same key, as show in the following pseudo code:

For Bc in B
  K=extract key from Bc
  Af=nearest A with key K before B
  If Af exists
    remove all A with key K before Af
    Create sequence Af, Bc (keyed under K)

The query B can be executed without considering the existing keys. If the number of keys is reasonable (say up to 100), the query B can be refined with a terms query to find out only the results Bs that share the same key.

Processing Constraints

Sequences of queries may have two constraints: maxspan and until.

The following is an example of a sequence having maxspan:

sequence maxspan=30 s
[A]
[B]

The maxspan defines a time limit in which the matches need to be found. Maxspan can range from milliseconds to days. The event search system 120 may check the maxspan each time a new item is added to a result sequence. For example, the pseudo code "create sequence Af, Bc (keyed under K)" can be changed to:

Create sequence Af, Bc (keyed under K) if Bc−sequence.start<maxspan

Accordingly, each time a new element is added to result sequence, the event search system 120 compute how much time passed from the start of the sequence, and if this time is less than maxspan, keeps the new element in the result sequence.

The following is an example of a sequence having constraint "until"

sequence
[A]
[B]
until [C]

The constrain "until" indicates that a sequence [A, B] needs to match before C matches or occurs. The event search system 120 may execute query C after executing the first query A. That is, the results for A are being discovered, and if at least one is found, the query C is being executed for the current tumbling window before running the result of the sequence query. This can facilitate discarding sequences early in their matching if C occurs within a sequence range.

Navigating the Dataset

The actual implementation of the event search processing can be affected by the fact that results of each query can vary significantly in terms of cardinality and location within the timeline and dataset. For example, a first query in sequence may return a first cluster of results at the beginning of the timeline and a second cluster at the end of the timeline without any matches in the middle of the dataset. Subsequent queries may return different clusters between the first clusters and the second cluster.

Considering the following sequence of queries:
sequence
[A]
[B]
[C]

where A returns a cluster at the very beginning of the timeline, B returns results through-out and C returns results at the very end of timeline. The assumption that all results have to occur within the same tumbling window does not work in this case because A and C can be so far apart that A and C would never overlap. In this case, B between A and C has to be read completely. Such sequence gaps can be common. To address this issue, the pagination or the tumbling window can be moved based on a 'base' query or a driver.

The base query can start with the first query, for example stage A or 0. If stage 0 does not return any results, it does not mean that there are no more matches in the timeline. Per example above, the matches might be at the tail of the timeline. Because there are no more As, the base window is advanced to the next stage, B or 1. As long as there are results, the query B drives the tumbling window. Once the stage B becomes empty, the next stage becomes the driver and so on until no more results are returned by a query.

Driving the tumbling window based on the base query is different from the pagination happening on each stage. For example, the query A can return 20 results and between A1 and A20 there might be 2000 B and 10000 C. The event search system 120 will keep requesting for a page of up to size P.

Thus, if page A (page for query A) returns 20, when running query B, the query B will be limited to range A1-A20 and keep requesting for results in chunks of P and match the results with A. The results from query B will be then incorporated such that the query C will be called between B1 and B2000 (which is a subset of A1 and A20) in chunks of P, and so on across all pages.

Tail Sequences

Most users are interested in most recent sequences or those matching at the end or tail of timeline. The processing of queries described in FIG. 3 would require reading all the data from datasets and thus does not account for whether the matches happen at the head or tail of the stream of data.

The event search system 120 may apply a similar search algorithm to determining head sequences. However, dataset range can be selected by moving back starting from the tail of the dataset.

For the following sequence of queries
sequence
[A]
[B]

query A (the driver) can be always descending, while the rest of the queries (B and others) will be ascending. This means that the event search system 120 processes query A by selecting the last P items in the stream, then starting query B forward from the last retrieved event A (that is the earliest event A) forward.

Figure 4:
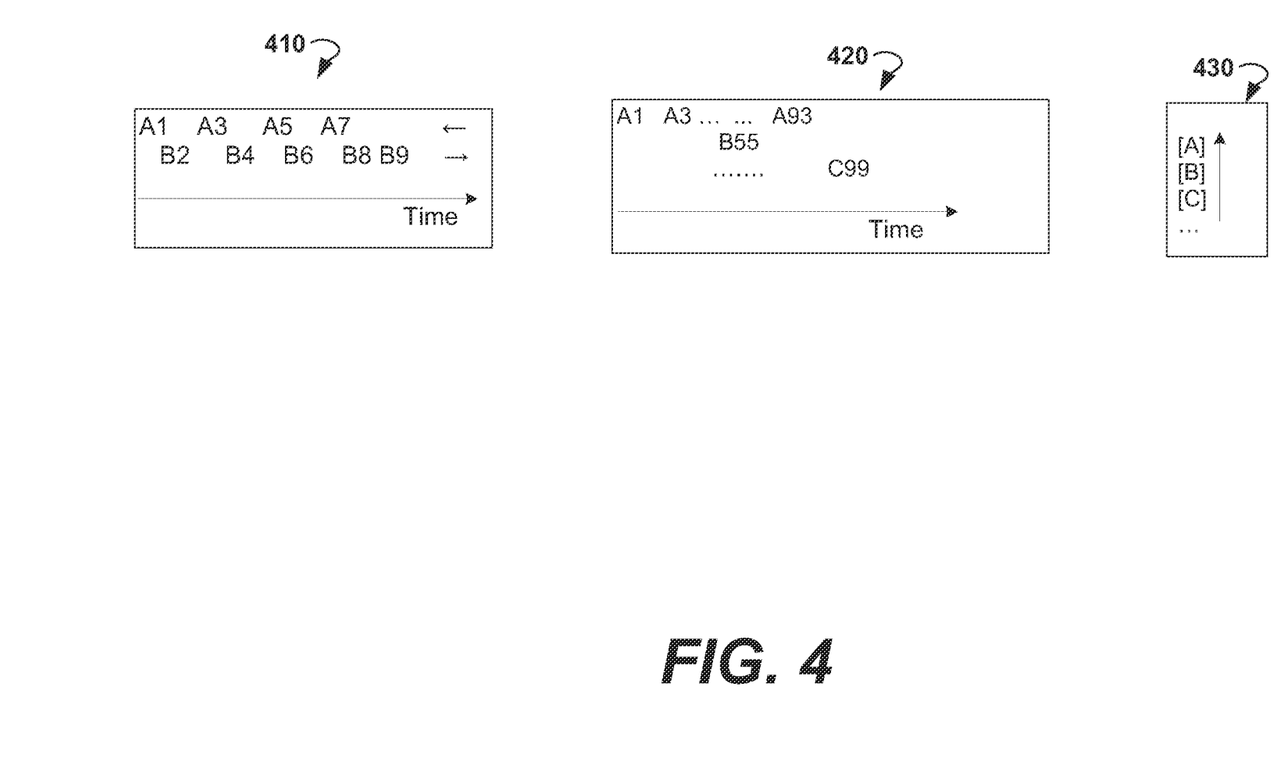
FIG. 4 are schematics showing details of example processing of event sequence search requests, according to some example embodiments.

FIG. 4 depicts a schematic showing a process 410 of matching queries to determine tail sequences. In the first step, query A asks for the last A that matches the query A and receives A7. The result is incorporated into query B which asks for all Bs higher than A7. The query B returns B8 and B9. Query A continues by searching for the next entry and A5 is returned. This is incorporated into the B query which asks for all matches higher than A5.

The query B will return B6, B8 and B9, where only B6 is needed. To avoid receiving B8 and B9, the query B could be limited to A7 so only the Bs between A5 and A7 are returned. Then the tumbling window moves to A3 and so on.

The process 410 may miss certain sequences because moving backwards works only if the sequences are within the current tumbling window. If the data is scattered, either some sequences can be missed or the data can be kept on being read.

The schematic 420 shows a sparse sequence of events in response to an example request including a sequence of queries A, B, and C. The correct result of search of the sequence is [A1, B55, C99]. The event search system 120 starts with A and keeps moving back until a matching B is found. Once a matching B is found, for C, the event search system 120 has to go back towards the tail since this is where C is located.

While moving forward (head to tail), the data is read in chunks since the data is ordered and matched on the spot because everything that can match will occur within or after the current page. The data before the current page was either matched or can be disregarded. When moving backwards this type of match is not possible.

When moving backwards, the event search system 120 uses a range query so it does not search the previously read pages. That means that the event search system 120 will only search for sequences between A93->latest, A91-A93, A89-A91, and so forth. Thus, the event search system 120, will miss the sequence [A1, B55, C99] because it does not search the data read for subsequent queries again.

One possible solution to improve searching algorithm is to perform matching sequences bottom-up as shown in schematic 430 instead of top-down. For the following sequences of queries
sequence
[A]
[B]

the event search system 120 can first find the matching Bs and then proceed with finding As. The main downside of this approach is keeping a lot of data around in particular when joining per key. When matching A first, the join key is used to filter out Bs (or any other query). When moving bottom-up, all the Bs need to be kept around until an A is found. The more queries there are, more matches will be kept around.

For the sparse sequence of events shown in schematic 420, the query C is executed first and finds C99. C99 cannot be discarded even if there no Bs are found in the next pages because eventually, as the example points out, there is a B to match.

Searching Each Sequence Individually

Instead of finding sequences by loading pages of data and filtering the pages out using the queries, another approach is to execute individual queries in sequences across a wide set of data. Thus, for example instead of looking for a page of As, reading the join keys, then searching for Bs in the page, matching Bs to As, and so forth, the event search system 120 may find a predetermined large amount of As and then find corresponding exact B and C.

The advantage of this approach is that the queries are very precise and thus should be executed fast. The disadvantage is that there might be an extensive number of searches, especially when dealing with multiple keys and, thus multiple cardinalities. Constraints like 'maxspan' or 'until' can also exacerbate the problem because these constraints are computed per sequence not event/query.

In the worst-case scenario, the number of searches is <number of stages in a sequence>*<join keys cardinality> which can reach hundreds.

Figure 5:
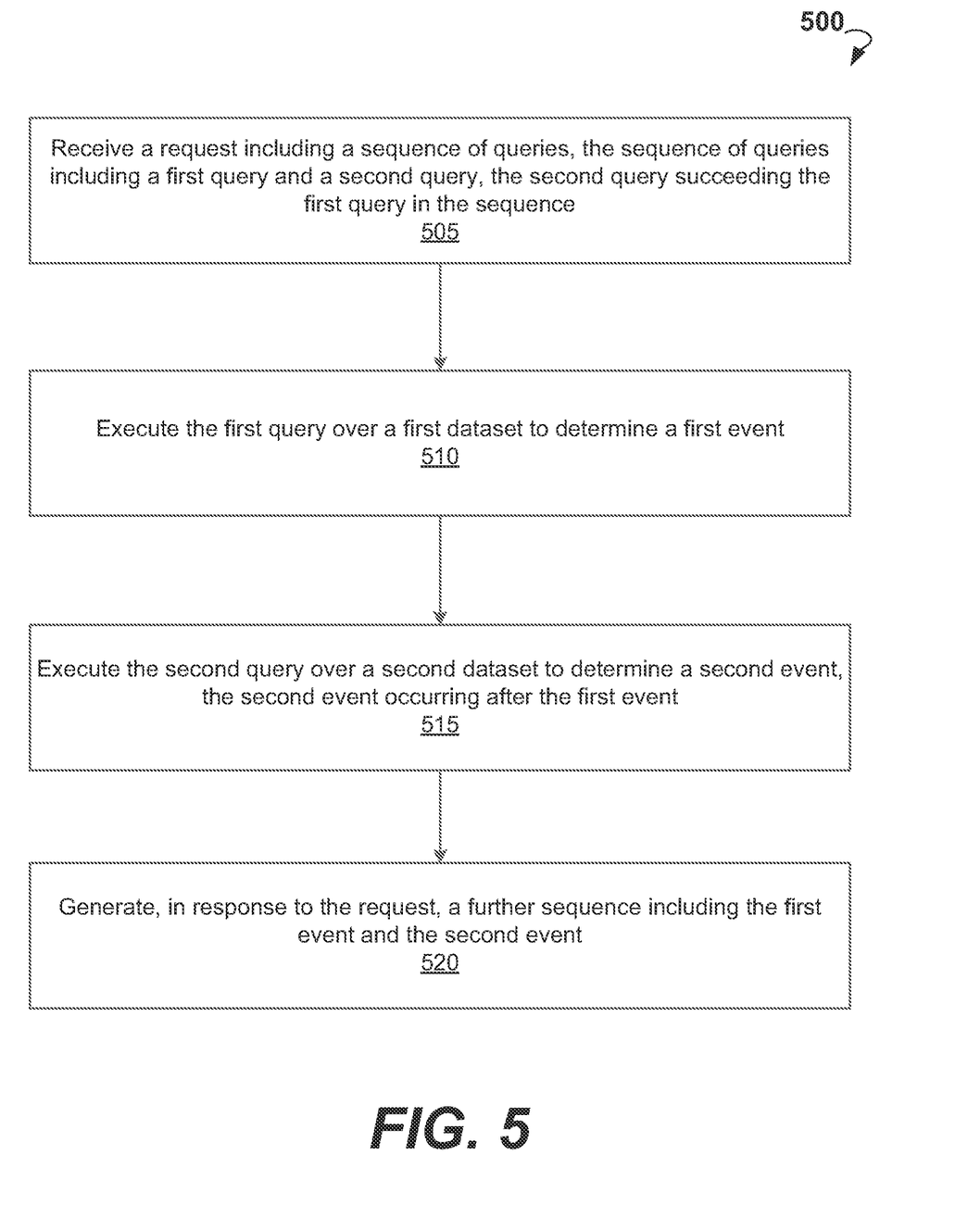
FIG. 5 is a flow chart of an example method for event sequences search, according to some example embodiments.

FIG. 5 is a flow chart of an example method 500 for event sequences search, according to some example embodiments. The method 500 may be performed within environment 100 illustrated in FIG. 1A by the event search system 120. Notably, the steps recited below may be implemented in an order different than described and shown in the FIG. 5. Moreover, the method 500 may have additional steps not shown herein, but which can be evident to those skilled in the art from the present disclosure.

In block 505, the method 500 may commence with receiving a request including a sequence of queries. The sequence of queries may include at least a first query and a second query. The second query may succeed the first query in the sequence. The first query and the second query may include at least one common search key. The request includes a predetermined time period.

In block 510, the method 500 may proceed with executing the first query over a first dataset to determine a first event. In block 515, the method 500 may proceed with executing the second query over a second dataset to determine a second event, the second event occurring after the first event. The second query can be executed upon determining the first event. Alternatively, the second query is executed concurrently with the first query.

The first dataset and the second dataset include log data concerning operations of a computing system. The first event and the second event each may include at least one of the following: an attempt to access the computing system via a port, an indication of a process started on the computing system, and one of an opening, creating, and modifying of a file on the computing system.

The determining the first event may include executing the first query over a part of the first dataset to determine a first event sequence and successively selecting the first event from the first event sequence starting from the latest event in the first sequence. The determining the second event may include executing the second query over the second data set to determine a second event sequence, where the second event sequence includes events occurring after the earliest event in the first event sequence. The determining of the second event may then include selecting the second event from the second event sequence as the closest event occurring after the selected first event.

The determination of the second event may include determining that the second event occurs within less than the predetermined time period after the first event. In block 520, the method 500 may proceed with generating, in response to the request, a further sequence including the first event and the second event. The method 500 may include executing the first query over the first dataset to determine a third event and verifying that the third event has occurred after the second event.

The method 500 may include determining that the second event precedes an event A1 and event A2, wherein the event A1 and the event A2 are results of executing the first query and the event A1 occurs prior to the event A2. The method 500 may preventing the event A1 from generating the further sequence.

In some embodiments, the method 500, may include, instead of the executing the first query prior to the executing the second query, executing the second query over the second dataset to determine the second event; and executing the first query over the first dataset to determine the first event, where the first event occurs before the second event.

Figure 6:
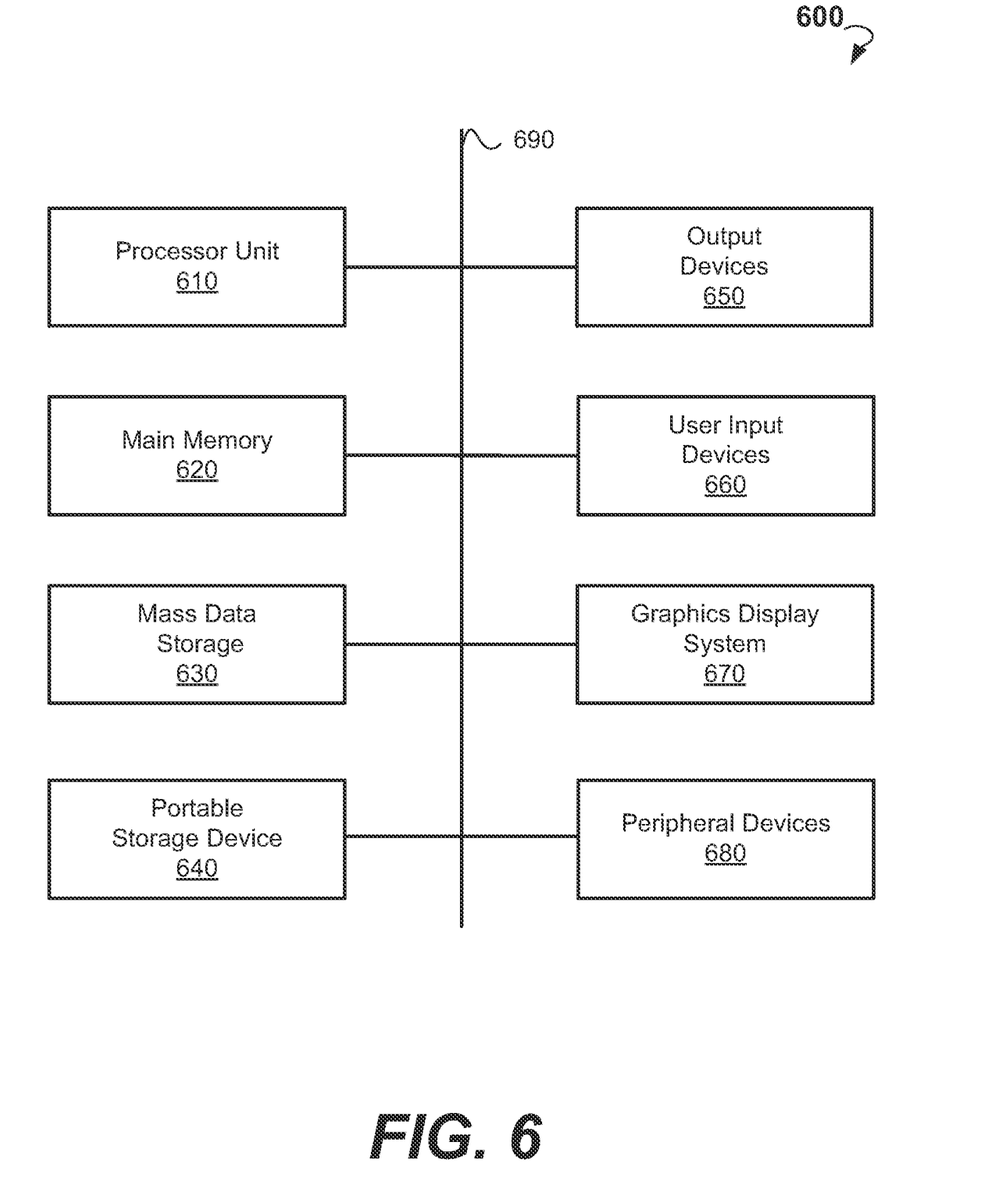
FIG. 6 is an example computer system that can be used to implement some embodiments of the present disclosure.

FIG. 6 illustrates an exemplary computer system 600 that may be used to implement some embodiments of the present disclosure. The computer system 600 of FIG. 6 may be implemented in the contexts of the likes of the client 110, the event search system 120, and the computing node(s) 140-$i$ ($i=1, \ldots, N$). The computer system 600 of FIG. 6 includes one or more processor units 510 and main memory 520. Main memory 620 stores, in part, instructions and data for execution by processor units 610. Main memory 620 stores the executable code when in operation, in this example. The computer system 600 of FIG. 6 further includes a mass data storage 630, portable storage device 640, output devices 650, user input devices 660, a graphics display system 670, and peripheral devices 680.

The components shown in FIG. 6 are depicted as being connected via a single bus 690. The components may be connected through one or more data transport means. Processor unit 610 and main memory 620 are connected via a local microprocessor bus, and the mass data storage 630, peripheral device(s) 680, portable storage device 640, and graphics display system 470 are connected via one or more input/output (I/O) buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 of FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones; an alphanumeric keypad, such as a keyboard, for inputting alphanumeric and other information; or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 can include a liquid crystal display (LCD) or other suitable display device. Graphics display system 670 is configurable to receive textual and graphical information and process the information for output to the display device.

Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, TIZEN, and other suitable operating systems.

The processing for various embodiments may be implemented in software that is cloud-based. In some embodiments, the computer system 600 is implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for searching event sequences, the method comprising:
receiving, by a distributed search engine, a request including a sequence of queries, the sequence of queries including a first query and a second query, the second query succeeding the first query in the sequence of queries;
executing, by the distributed search engine, the first query over a first dataset to determine a first event;
executing, by the distributed search engine, the second query over a second dataset to determine a second event, the second event occurring after the first event, wherein the first and second datasets reside in multiple data sources;
generating, by the distributed search engine and in response to the request, a further sequence of queries including the first event and the second event;
in response to determining that the second event precedes an event A1 and event A2, wherein the event A1 and the event A2 are results of executing the first query and the event A1 occurring prior to the event A2, preventing, by the distributed search engine, the event A1 from generating the further sequence.

2. The method of claim 1, wherein the second query is executed upon determining the first event.

3. The method of claim 1, wherein the second query is executed concurrently with the first query.

4. The method of claim 1, wherein the first query and the second query include at least one common search key.

5. The method of claim 1, wherein:
the request includes a predetermined time period; and
the determining the second event includes determining that the second event occurs within less than the predetermined time period after the first event.

6. The method of claim 1, further comprising:
executing the first query over the first dataset to determine a third event; and
verifying that the third event has occurred after the second event.

7. The method of claim 1, wherein:
the determining of the first event includes:
executing the first query over a part of the first dataset to determine a first event sequence; and
successively selecting the first event from the first event sequence starting from a latest event in the first sequence; and
the determining of the second event includes:
executing the second query over the second dataset to determine a second event sequence including events occurring after an earliest event in the first event sequence; and
selecting the second event from the second event sequence as a closest event occurring after the selected first event.

8. The method of claim 1, comprising, instead of the executing the first query prior to the executing the second query:
executing the second query over the second dataset to determine the second event; and
executing the first query over the first dataset to determine the first event, the first event occurring before the second event.

9. The method of claim 1, wherein:
the first dataset and the second dataset include log data concerning operations of a computing system; and
the first event and the second event include at least one of the following: an attempt to access the computing system via a port, an indication of a process started on the computing system, and one of an opening, a creating, and a modifying of a file on the computing system.

10. A system for event sequences search, the system comprising:
- at least one processor; and
- a memory communicatively coupled to the processor, the memory storing instructions executable by the at least one processor to perform a method comprising:
- receiving, by a distributed search engine, a request including a sequence of queries, the sequence of queries including a first query and a second query, the second query succeeding the first query in the sequence of queries;
- executing, by the distributed search engine, the first query over a first dataset to determine a first event;
- executing, by the distributed search engine, the second query over a second dataset to determine a second event, the second event occurring after the first event, wherein the first and second datasets reside in multiple data sources;
- generating, by the distributed search engine and in response to the request, a further sequence of queries including the first event and the second event;
- in response to determining that the second event precedes an event A1 and event A2, wherein the event A1 and the event A2 are results of executing the first query and the event A1 occurring prior to the event A2, preventing, by the distributed search engine, the event A1 from generating the further sequence.

11. The system of claim 10, wherein the second query is executed upon determining the first event.

12. The system of claim 10, wherein the second query is executed concurrently with the first query.

13. The system of claim 10, wherein the first query and the second query include at least one common search key.

14. The system of claim 10, wherein:
- the request includes a predetermined time period; and
- the determining the second event includes determining that the second event occurs within the predetermined time period of the first event.

15. The system of claim 10, further comprising:
- executing the first query over the first dataset to determine a third event; and
- verifying that the third event has occurred after the second event.

16. The system of claim 10, wherein:
the determining of the first event includes:
- executing the first query over a part of the first dataset to determine a first event sequence; and
- successively selecting the first event from the first event sequence starting from a latest event in the first sequence; and the determining of the second event includes:
- executing the second query over the second dataset to determine a second event sequence including events occurring after an earliest event in the first event sequence; and
- selecting the second event from the second event sequence as a closest event occurring after the selected first event.

17. The system of claim 10, comprising, instead of the executing the first query prior to the executing the second query:
- executing the second query over the second dataset to determine the second event; and
- executing the first query over the first dataset to determine the first event, the first event occurring before the second event.

18. A non-transitory computer-readable storage medium having embodied thereon instructions, which when executed by at least one processor, perform steps of a method, the method comprising:
- receiving, by a distributed search engine, a request including a sequence of queries, the sequence of queries including a first query and a second query, the second query succeeding the first query in the sequence of queries;
- executing, by the distributed search engine, the first query over a first dataset to determine a first event;
- executing, by the distributed search engine, the second query over a second dataset to determine a second event, the second event occurring after the first event, wherein the first and second datasets reside in multiple data sources;
- generating, by the distributed search engine and in response to the request, a further sequence of queries including the first event and the second event;
- in response to determining that the second event precedes an event A1 and event A2, wherein the event A1 and the event A2 are results of executing the first query and the event A1 occurring prior to the event A2, preventing, by the distributed search engine, the event A1 from generating the further sequence.

* * * * *